UNITED STATES PATENT OFFICE 3,279,917
Patented Oct. 18, 1966

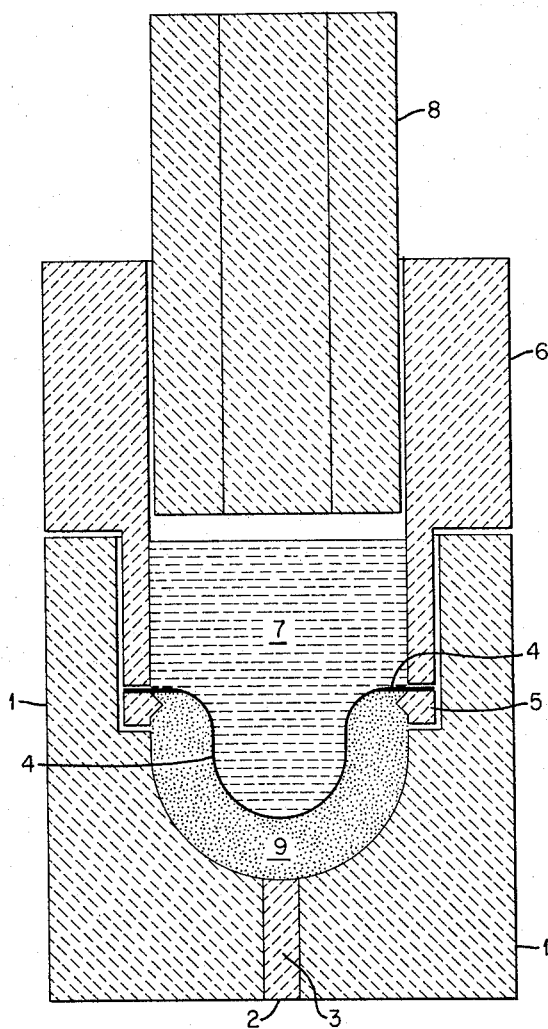

3,279,917
HIGH TEMPERATURE ISOSTATIC PRESSING
Ambrose H. Ballard and Rudolph Hendricks, Jr., Oak Ridge, Tenn., assignors to the United States of America as represented by the United States Atomic Energy Commission
Filed Nov. 20, 1963, Ser. No. 325,192
5 Claims. (Cl. 75—226)

Our invention relates to methods and systems for fabricating articles from powders.

Conventional methods of pressing powders into articles have the disadvantage that undesirable density gradients are produced in the finished product of articles having complex shapes because of non-uniform pressure distribution during pressing. One method of pressing, isostatic pressing, avoids the disadvantages resulting from non-uniform distribution of pressure by transmitting pressure from the press to surfaces of the article by means of a fluid in pressure-transmitting relationship with these surfaces. Isostatic pressing typically has been carried out at relatively low temperatures because of the physical limitations brought about by the use of fluids. A recent development in isostatic pressing using natural flake graphite as the isostatic pressing medium permitting high temperature isostatic pressing in simple devices is disclosed in copending, coassigned application Serial No. 292,197, filed June 26, 1963, in the names of John M. Googin and Lawrence M. McLaughlin for "Method of Fabricating Articles from Powders." As is well known, articles made by hot-pressing powders are superior in many properties to articles made by cold-pressing, and the only method of directly forming non-porous compacts of precise dimensions from many powders is by hot-pressing. However, a technique useful in cold isostatic pressing of transmitting pressure through a flexible metal membrane has disadvantages and limitations when applied to hot-isostatic pressing since at the temperatures of interest (up to 2000° C.) most metals are eliminated as materials of construction. If the metal membrane melts, it may run into pores of the compact and it also may be forced out of the die and solidfy on moving parts, thus welding the die. Even if the maximum temperature is below the melting point of the metal membrane, difficulties arise because of different coefficients of expansion of the metal membrane and the powder compact which may cause the compact to crack upon cooling. In view of these problems, the procedure followed in hot-isostatic pressing has been to (1) form a self-sustaining compact by cold-isostatic pressing techniques, and (2) place the resulting compact in a high-temperature, pressure-transmitting medium and heat the compact while pressure is being applied. It is obvious that this two-step procedure is less desirable than a single-step one.

It is accordingly one object of our invention to provide an improved method and system for hot-isostatic pressing powders.

Other objects of our invention will become apparent from the following description and the claims appended hereto.

In accordance with our invention, we have provided a method of making a body by simultaneously compressing and sintering a mass of powdered material comprising the steps of:

(a) Providing a die cavity defined by first and second cooperating mold parts, said first mold part comprising a rigid, thermally-stable material, and said second mold part comprising a flexible membrane made of a thermally unstable material and having an outer surface in contact with an isostatic pressure-transmitting medium;

(b) Confining a mass of said powdered material within said die cavity;

(c) Heating the resulting confined mass of powdered material to a sintering temperature and simultaneously applying pressure to said mass through said isostatic pressure-transmitting medium; and (d) Removing the heat-produced decomposition products of said second mold part.

Our invention eliminates the need for a separate step of forming the article from a powder prior to hot-pressing. The mold part through which pressure is transmitted retains its shape, and thus the shape of the powder mass, until sufficient pressure is applied to maintain the powder charge in the desired configuration. Upon heating, the membrane becomes soft, decomposes, and the decomposition products are removed. An anomalous feature of our development is that a plastic incapable of withstanding a high temptrature is an indispensable feature of a device and a simplified method for carrying out a high temperature isostatic pressing process.

The figure is a vertical section view of a simple embodiment of our invention designed to form hemishells. In the figure a female die member 1 is provided with port 2 sealed by plug 3. A flexible membrane 4 is held in place by ring 5 and sleeve 6.

In the use of the device shown the assembly is placed with the base of die member 1 up and the cavity defined by membrane 4 and member 1 is filled with powder 9 through the opening 2. The opening 2 is then sealed with plug 3 and the assembly is positioned as shown with the base down. The space above the flexible membrane 4 is filled with an isostatic fluid pressing medium 7 such as natural flake graphite and the plunger 8 is positioned above the flake graphite. This completed assembly is placed within a furnace provided with means for exerting longitudinal pressure on plunger 8. Although it is not necessary, in the preferred method of carrying out our invention sufficient pressure, i.e., 50 to 100 p.s.i., is applied to lock the die parts before heating. The furnace is then evacuated and heat is applied to the die and the powder mass. As the temperature is raised, the membrane softens and then decomposes and the gaseous decomposition products are removed by the vacuum. As much heat and pressure can then be applied as the system will withstand.

Any powder capable of being formed into a body under heat and pressure may be used in our method and system. In view of the high temperatures capable of being reached, our invention is especially useful in making bodies out of powders such as tungsten powder having a high sintering temperature.

The isostatic pressing medium may be any material useful in conventional isostatic pressing techniques which is inert to the powder being pressed. Suitable materials are powdered ceramics such as powdered glass, and powdered metals. The preferred isostatic pressing medium is natural flake graphite.

The rigid die members may be made of materials conventionally useful in hot-isostatic pressing, and graphite or tungsten are preferred for very high temperature pressing.

The flexible membrane must be made of a material which decomposes and volatilizes upon heating, leaving no residue. The membrane and the decomposition products must not react with the powder being pressed or the isostatic pressing medium. We have found that thermoplastic materials containing only carbon and hydrogen or carbon, hydrogen and oxygen are suitable but that thermosetting plastics are not suitable. Examples of useful materials are polyethylene, polypropylene and polystyrene, and polystyrene is preferred.

Having thus described our invention, the following example is given to illustrate it in more detail.

Example

An assembly made of graphite in accordance with the figure is filled with aluminum oxide; natural flake graphite is the isostatic pressing medium; and the flexible membrane is made of polystyrene. The completed assembly is placed in an induction furnace provided with means for exerting force on the plunger. A pressure of about 100 pounds per square inch is applied to lock the die parts. The furnace is then evacuated and the die is heated. At from 400° C. to 600° C. the polystyrene decomposes and the decomposition products, all volatile, are removed by the vacuum. A pressure of about 2000 pounds per square inch is applied as the temperature of the assembly is raised to about 1500° C. The pressed assembly has a density of 95 percent of theoretical and is uncontaminated by decomposition products of polystyrene.

The above example is given to illustrate our invention and it should be limited only in accordance with the following claims.

Having thus described our invention, we claim:

1. A method of making a body by simultaneously compressing and sintering a mass of powdered material comprising the steps of:
   (a) providing a die cavity defined by first and second cooperating mold parts, said first mold part comprising a rigid, thermally stable material, and said second mold part comprising a flexible membrane made of a thermally unstable material and having an outer surface in contact with a solid particulate isostatic pressure transmitting medium;
   (b) confining a mass of said powdered material within said die cavity;
   (c) heating the resulting confined mass of powdered material to a sintering temperature and simultaneously applying pressure to said mass through said isostatic pressure-transmitting medium; and
   (d) removing the decomposition products of said second mold part.

2. The method of claim 1 wherein said flexible membrane comprises carbon and hydrogen.

3. The method of claim 1 wherein said flexible membrane comprises carbon, hydrogen and oxygen.

4. The method of claim 1 wherein said flexible membrane is a thermoplastic selected from polysytrene, polyethylene and polypropylene.

5. The method of claim 1 wherein said flexible membrane is polystyrene.

References Cited by the Examiner

UNITED STATES PATENTS

| | | | |
|---|---|---|---|
| 1,321,125 | 11/1919 | Pfaustiehl | 264—313 X |
| 2,725,288 | 11/1955 | Dodds et al. | 75—226 |
| 3,111,396 | 11/1963 | Ball. | |
| 3,242,242 | 3/1966 | Bournique | 264—71 |

FOREIGN PATENTS 821,282   10/1959   Great Britain.

L. DEWAYNE RUTLEDGE, *Primary Examiner.*

R. L. GRUDZIECKI, *Assistant Examiner.*